Aug. 23, 1932.　　　　G. RAYMOND　　　　1,872,810
METHOD OF AND APPARATUS FOR ASSEMBLING METAL SECTIONS
Filed Sept. 10, 1930　　2 Sheets-Sheet 1
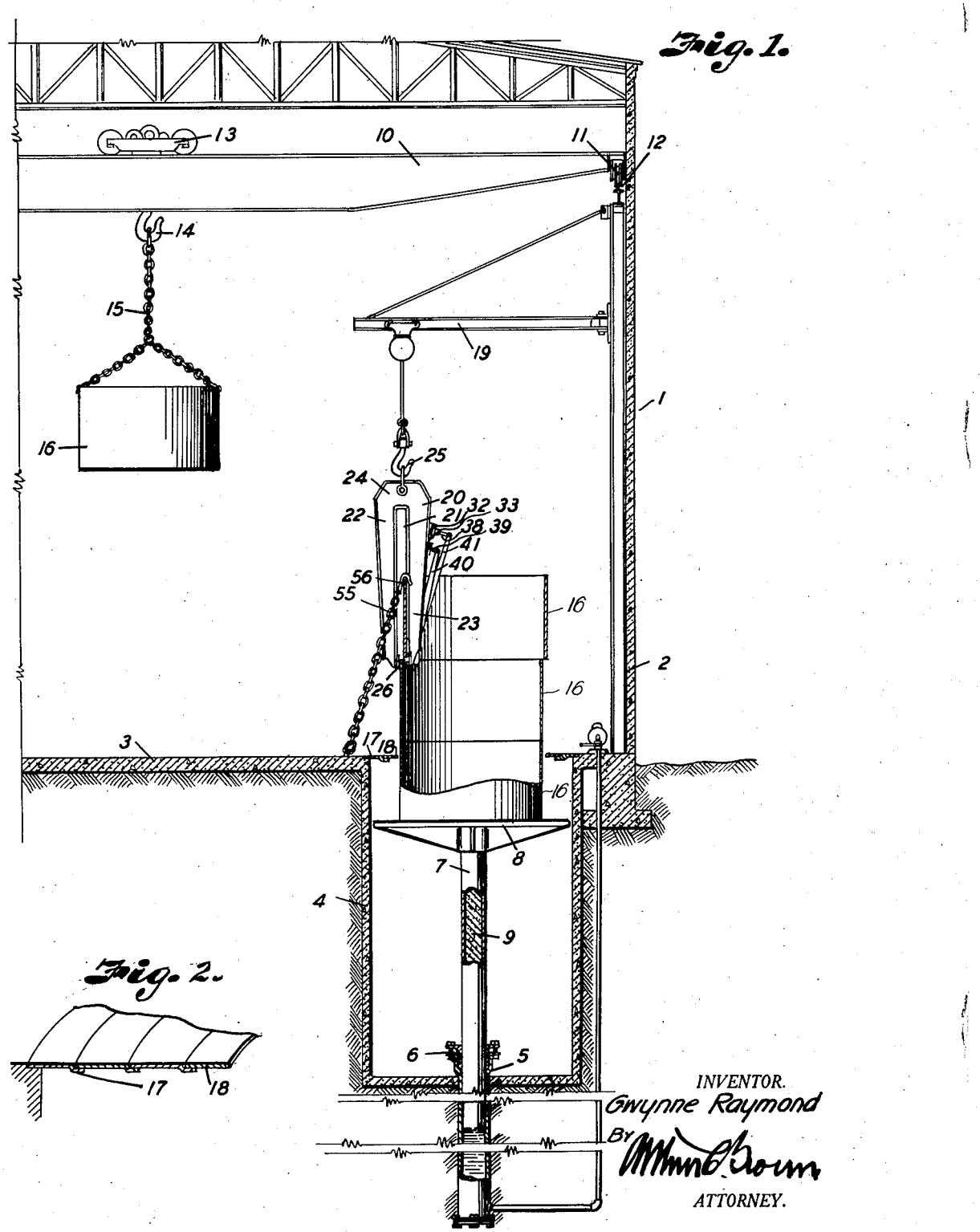
INVENTOR.
Gwynne Raymond
By
ATTORNEY.

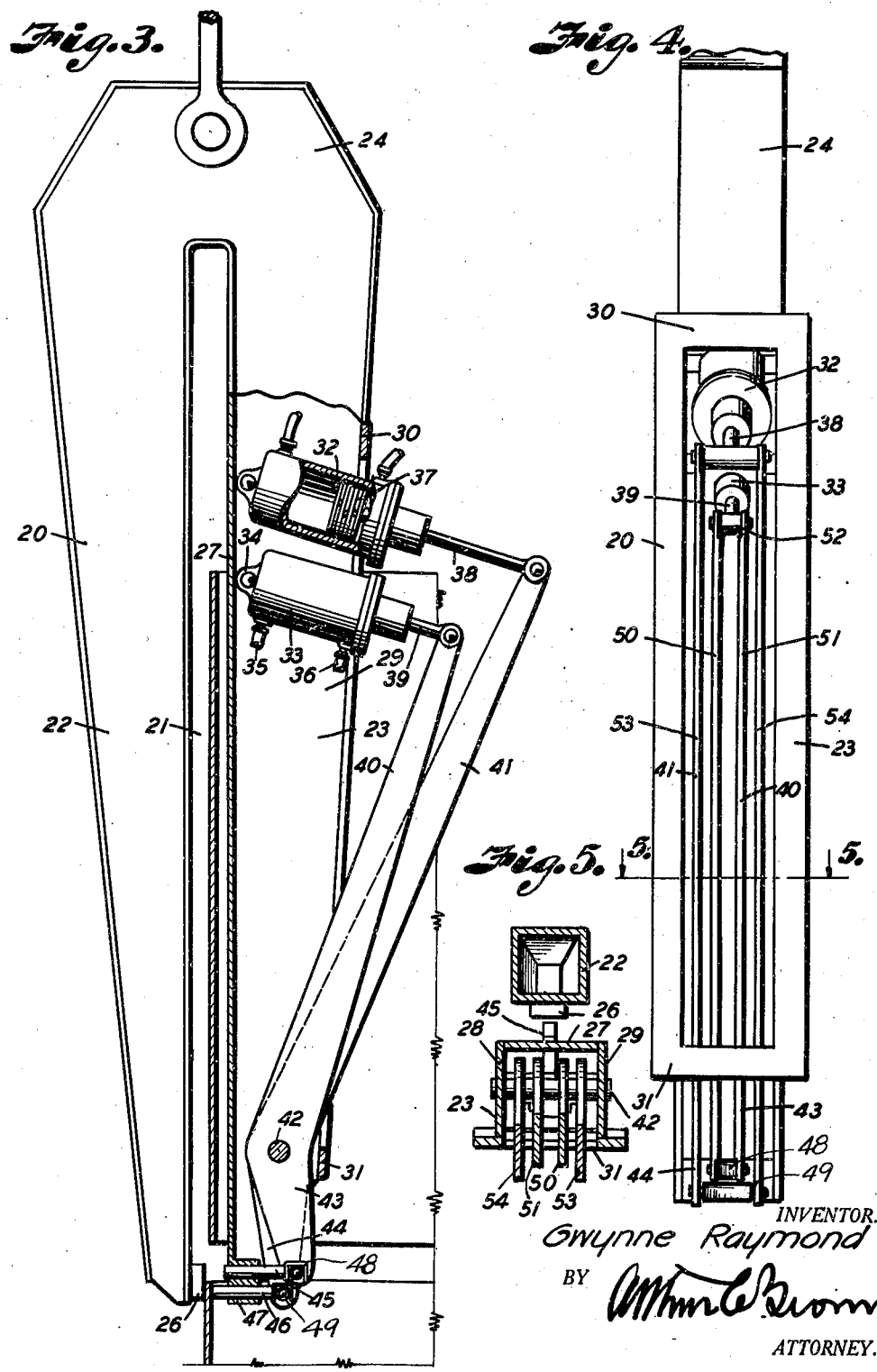

Patented Aug. 23, 1932

1,872,810

UNITED STATES PATENT OFFICE

GWYNNE RAYMOND, OF KANSAS CITY, MISSOURI

METHOD OF AND APPARATUS FOR ASSEMBLING METAL SECTIONS

Application filed September 10, 1930. Serial No. 480,822.

My invention relates to methods of and apparatus for assembling metal sections to form tanks or the like in which relatively accurate adjustment of adjoining edge portions of the sections is required.

The shell sections or rings of tanks such as bulk station tanks and oil tanks have customarily been assembled in horizontal position preparatory to securing the adjacent edges together by suitable means such as welding or riveting. The rings being limber tend to sag or flatten from a true shape, for example from circular into elliptical shape, and great difficulty is encountered in bringing the edges of adjacent rings into proper relation to form the roundabout or girth seams. The sagging effect does not occur uniformly from end to end of a ring, particularly after a head has been fastened to one end thereof, and the free end edge of the ring opposite the head lies in a vertical curved surface rather than in a vertical plane surface, due to sagging of the top part of the ring, thus increasing the difficulty of effecting accurate relationship, for example close alignment, between the next relatively limber ring and the first named ring.

Attachment of flanged heads to the rings of tanks is rendered difficult for the same reasons when the rings are positioned prone on the ground.

The difficulties of assembly due to distortion of relatively limber rings when in prone position might be obviated if a tank could be assembled in a vertical position, so that the weight of the rings would not tend to pull the portions thereof out of shape, and the heads could be fitted to the rings more readily.

Assembly of tank rings and heads in vertical position would require, however, a relatively high building and a large amount of scaffolding, thus involving relatively great expense and labor for assembly and requiring the workmen to operate in awkward positions.

Another difficulty encountered in assembling metal sections to build a tank is due to the requirement of springing adjacent edge portions of plates, rings, and the like into accurate abutting or overlapping relationship and effecting proper spacing of the adjacent edges for application of assembling means such as tack welds, rivets, bolts or the like, to secure the sections together.

Rings, for example, are relatively large, cumbersome and heavy and access to the inner and outer surfaces of adjacent edge portions which require adjustment is not readily accomplished, two or more workmen usually being required to cooperate for bringing the portions into proper relationship and holding them in position while the securing means is applied.

The principal objects of my invention therefore, are to facilitate assembly of tanks or the like in vertical position, to provide means for accurately adjusting adjacent edge portions of metal plates to receive securing means, and to retain portions of metal sections in adjusted position while the adjacent edges are being secured together, whereby the labor and hazard of assembling metal tanks may be reduced and accuracy of relationship between tank sections may be assured.

In accomplishing these and other objects of my invention, I have provided a new method and improved details of structure, for carrying out the method, the preferred forms of which are illustrated in the accompanying drawings, wherein:

Fig. 1 is a vertical section of a portion of a tank assembling plant equipped with my improved apparatus for employing my method of assembling metal tank sections.

Fig. 2 is an enlarged perspective view of a portion of a supplemental platform located on the edge of an elevator well.

Fig. 3 is an enlarged elevation of approximately abutting portions of tank sections and a clamp including separately operable ram members, one wall of the clamp and one cylinder of a pneumatic riveting device being shown broken away to illustrate construction and air tubes connected with the cylinders being shown fragmentarily.

Fig. 4 is an end elevation of the clamp.

Fig. 5 is a section on the line 5—5, Fig. 4.

Referring in detail to the drawings:

1 designates generally a tank factory building including a side wall 2, a floor 3 provided with a pit or well 4 for accommodating an elevator, for example a hydraulic elevating including a tubular socket 5 provided with a packing gland 6 in which a ram or plunger 7 operates for elevating and lowering a preferably circular platform 8 fixed to the upper end of the plunger.

The plunger preferably consists of a relatively thin cylindrical pipe having an outer surface turned smooth to slide and rotate freely in the gland and tube and filled with concrete 9 to stiffen the pipe and render the same rigid.

The building is further provided with an overhead travelling crane including a beam 10 having rollers 11 running on rails 12 and a carriage 13 running on the beam provided with a depending hook 14 to receive a chain 15 for attachment to sections 16 for moving the sections toward the well to locate the same in vertical position on the platform of the elevator, and moving assembled structures from the well.

The sections 16 are illustrated as cylindrical sections or rings adapted to compose a cylindrical tank.

When a tank ring is located on the platform, the elevator may be operated to locate the upper edge of the ring at a suitable elevation above the floor for access to the same by workmen standing on the floor, and a second ring may then be located in approximately suitable relation with the first named ring for application of securing means, whereupon apparatus for effecting true adjustment of the adjacent edges may be operated, the two rings may be secured together in adjusted relation, and the elevator may be lowered to permit a third tank ring to be mounted on the connected rings.

Any desired and suitable means may be employed for connecting the rings, and the apparatus may be operated to effect adjustment in accordance with the mode of securing the rings together. For convenience, however, the apparatus is illustrated and described as adapted for assembling welded tanks having butt joints, the rings being first connected by tack welds, and the joints completed after a number of rings have been so connected.

The well has sufficient depth to permit the elevator to support an assembly of a substantial number of rings forming a relatively high tank with the upper edge of the upper ring adjacent the floor, and may have sufficient diameter to accommodate an elevator platform adapted to support a ring having relatively great diameter.

In order to permit workmen to stand close to tank rings mounted on the elevator platform when relatively small rings are being assembled on a large platform, a series of annuli such as 17 and 18 are used to reduce the diameter of the floor opening at the upper edge of the well, the large annulus 17 being adapted to seat in an annular notch or recess formed at the edge of the opening to provide a shelf, and having a downwardly offset flange at its inner periphery to seat the second inner annulus 18.

One or more annuli may be mounted for support from the floor to provide an extension thereof into the wall opening, a suitable member being provided to form an opening coaxial with the plunger corresponding to the diameter of the tank rings, whereby the inner periphery of the inner ring may substantially engage the outer surface of a tank ring and afford a supplemental floor on which the workmen may stand.

A wall jib crane 19 is further mounted on the wall of the building adjacent the well to assist in moving parts and apparatus to and from assembling position, and particularly for suspending and moving vertically and horizontally a clamp or yoke riveter 20 later described in detail for effecting proper assembly of the rings.

In the drawings two rings are shown aligned and connected and the elevator depressed to locate the upper edge of the second ring in a convenient position to permit the workmen to operate thereon, and a third ring is shown mounted on the second ring, to which position it was delivered by the traveling crane.

The aligning clamp is provided with a slot 21 forming elongated spaced parallel arms 22 and 23 adapted to pass on the inner and outer sides respectively of a superimposed ring to locate the free outer or lower ends of the arms adjacent the abutting edge portions of the tank rings, and a head 24 adapted for receiving a hook 25 for suspending the clamp from the jib crane.

Projecting into the slot 21 from the arm 22 at the outer end thereof is an anvil or fixed ram 26, and the clamp is adapted to be lowered to locate the lower portion of the fixed ram in engagement with the upper edge portion of the lower tank ring, leaving the upper portion of the ram free to receive the lower edge portion of the upper tank ring.

The clamp arm 23 includes an inner vertical wall plate 27, spaced side walls 28 and 29 connected by upper and lower cross bars 30 and 31, Figs. 4 and 5, and forming a slot at right angles to the slot 21 to provide a housing for pressure cylinders 32 and 33 having ears 34 fixed to the side walls, and protruding from the housing in downwardly outwardly inclined positions. Air under pressure is delivered to and relieved from the cylinders by tubes 35 and 36 at opposite ends thereof to operate pistons 37 having cylindrical rods 38 and 39 respectively, pivotally connected to the upper ends of the lower and upper ram cranks or levers 40 and 41 pivoted on a transverse pin 42 located in the side walls adjacent the lower end of said arms.

The levers have relatively long operating arms and relatively short power arms 43 and 44 respectively provided with upper and lower plungers or rams 45 and 46 slidable in bearing openings in a boss 47 at the lower end of the inner wall plate 27 substantially registering with the anvil or fixed ram.

The movable rams are separately operable to engage successively and respectively the inner face of an upper edge portion of the lower ring to hold the same against the anvil, and the inner face of a lower edge portion of the upper ring to move the same into alignment with the lower ring and hold the same rigidly in aligned and registering position.

The rams are cylindrical and are provided with brackets or yokes 48 at their rear ends mounted on hardened rollers 49 rotatably mounted on the levers whereby translation of curvilinear motion of the levers into rectilinear motion of the rams in their bearings is effected. The lever 40 preferably comprises spaced plates or bars 50 and 51, (Figs. 4 and 5) having upper ends connected by a pivot bar 52 on which the outer end of the piston rod 39 is rotatively mounted, and lower ends connected by the ram-engaged roller. The lever 41 comprises plates 53 and 54 longer than the plates of the lever 40, to enable the lever 41 to move between the spaced plates of the larger lever, and is connected to its operating piston and ram in a manner similar to that described for the lever 40.

A chain 55 may be fixed to the floor adjacent the elevator wall, having a hook 56 to engage the upper edge of a suspended ring for anchoring the ring, while a ring supported by the elevator is raised into engagement therewith.

In using the invention, a ring may be mounted on the elevator platform, and lowered to locate the upper edge thereof at an elevation convenient for workmen. A second ring may then be suspended above the first ring, and the clamp lowered over the upper ring to locate the anvil and rams at the adjacent edges of the rings.

The lower ram will be operated to secure the lower ring to the clamp. The upper ring will then be adjusted to located the edge portion adjacent the clamped edge portion of the lower ring approximately in suitable relation therewith to receive a weld. The upper ram will then be operated to clamp said edge portion of the upper ring to the anvil.

The adjacent abutting portions of the two rings may be tack welded or otherwise fastened together while held in alignment by the clamp. The clamp rams may then be released, and the tank moved rotatively, for example by rotating the elevator plunger, to bring other peripheral portions of the rings adjacent the position of the workmen and into the slot of the clamp, thus avoiding necessity for shifting the clamp in a circular path about the tank rings.

The aligning process may then be repeated, the aligned portions tack welded by successive operations of the riveting mechanisms, the air released, the tank again partially rotated, and the process continued until a desired number of welds or other fastenings have been applied to assure retention of the rings in aligned connected relation.

The process of superimposing a tank ring on a lower ring may be repeated until a tank of a desired height is assembled, the elevator lowering the tank rings into the well as the steps proceed so that the alignment and welding may be effected in each instance by workmen standing on the floor or on the supplemental annular platform.

It is to be understood that a head may be initially mounted on the elevator platform, and a ring mounted in the head and secured thereto, to receive a superimposed ring; and that a flanged head may be mounted on the topmost ring to complete the tank structure, the rings and heads being aligned and held together for welding in a manner similar to that described for handling rings.

When the assembly of tank rings is completed the clamp may be moved aside, the crane operated to locate the carriage above the tank, the hydraulic elevator may be operated to elevate the tank substantially to the floor level and the crane trolley may be attached to the upper end of the tank by a sling and being moved laterally across the room, let the tank down into horizontal position wherein the welding of the seams may be completed.

One of the particularly important features of the invention consists in the means for assuring proper vertical alignment of the rings throughout the circumference thereof. The separately operating rams movable on the inside of the tank at vertically spaced positions to press the lower and upper rings respectively against the anvil assure true alignment of the abutting portions, shifting the lower edge of the upper portion into proper abutting relation with the upper edge of the lower portion.

It is apparent that the superimposed tank ring may be suspended throughout any desired portion of the period of assembly, and either the suspending means or the elevator may be operated to effect desired spacing between the adjacent edges of the rings.

Suitable means may be employed for forcing edge portions into registry and into engagement, for example the chain fixed to the floor having a hook adapted to engage the upper edge of the superimposed ring whereby the upper ring may be retained while the elevator is operated to move the lower ring into engagement with the upper ring and force the vertical abutment of the edges, whereupon the upper ram may be actuated to shift the portion of the upper ring into horizontal alignment with the lower ring.

It is further apparent that the suspended tank ring may be adjusted vertically after the clamp straddling the upper ring has been latched to the lower ring by the lower ram and anvil, and that the upper ram may be operated when the suitable spacing adjustment has been made to align the upper ring with the lower and to hold the two rings in alignment while the welding operation is performed.

Attention is further called to the structure of the levers of the riveting devices, each comprising a pair of plates, the longer lever having the lower ram at its lower end and extending upwardly beyond the upper end of the shorter lever and having said plates mounted on each side of the pair of plates forming the shorter lever.

The method and apparatus have been described as applied to assembling welded tanks having butt joints, it being apparent however that the method and apparatus may be adapted for adjusting adjacent edge portions of overlapping or abutting plates of any shape and securing the plates together by means suited to the particular type of structure being assembled.

What I claim and desire to secure by Letters Patent is:

1. The method of assembling metal sections including supporting a base section on its lower edge with its upper edge at a working level above a floor, lowering a second section to close aligning relation with the base section, connecting the adjacent edges of the sections, lowering the support for the base section to position the assembled sections with the opper edge of the added section at the working level, lowering a third section into close aligning relation with the second section, and connecting the adjacent edges of the second and third sections.

2. The method of assembling metal sections including intermittently lowering successively assembled sections relative to a floor to position the free edge of each successively upper section at a working level above the floor, partially connecting the sections during the periods of rest, transferring the assembled sections to the floor, and completing the connections on the floor.

3. The method of assembling metal sections including intermittently lowering successively assembled sections relative to a floor to position the free edge of each successively upper section at a working level above the floor, forming preliminary connections between the sections during the successive periods of rest, returning the assembled structure to the floor level, transferring the structure to the floor, and completing the connections with the structure on the floor.

4. The method of assembling metal sections which consists in placing a section on a support, placing a second section on said first mentioned section, securing an aligning clamp to said first mentioned section, securing said clamp to said second mentioned section, thereby drawing said sections into alignment, uniting the adjacent edges of said sections, and then removing said clamp.

5. The method of assembling metal sections which consists in placing a section with its lower edge resting on a support, placing a second section on said first mentioned section, securing an aligning clamp to said first section adjacent its upper edge, securing said clamp to said second section adjacent its lower edge and by said last mentioned securing of the clamp drawing said sections into alignment, uniting said sections at their adjacent edges, then removing said aligning clamp, and lowering the support to position the upper edge of the second section in the position formerly occupied by the first section for application of a third section.

6. The method of assembling cylindrical metal sections including supporting a base section with its upper edge at a working level above a floor, lowering a second section to close aligning relation with the base section, forming a preliminary connection between the sections, rotating the sections to bring another portion of the sections in position for forming a second preliminary connection, and lowering the assembled sections to position the upper edge of the added section at the working level to assemble a third section.

7. The method of assembling cylindrical metal sections including supporting a base section with its upper edge at a working level above a floor, lowering a second section to close aligning relation with the base section, forming a preliminary connection between the sections, rotating the sections to bring another portion of the sections in position for forming a second preliminary connection, lowering the assembled sections to position the upper edge of the added section at the working level to assemble a third section, returning the assembled structure to the floor level, transferring the structure to the floor, and completing the connections with the structure on the floor.

In testimony whereof I affix my signature.

GWYNNE RAYMOND.